United States Patent [19]
Naramura

[11] Patent Number: 5,540,943
[45] Date of Patent: * Jul. 30, 1996

[54] SANDWICH PREPARATION APPARATUS

[75] Inventor: Michiyuki Naramura, Okayama-ken, Japan

[73] Assignee: Kabushiki Kaisha Kyowa Kogyosho, Okayama-ken, Japan

[*] Notice: The term of this patent shall not extend beyond the expiration date of Pat. No. 5,365,835.

[21] Appl. No.: 349,891

[22] Filed: Dec. 6, 1994

[30] Foreign Application Priority Data

Apr. 14, 1994 [JP] Japan .................................. 6-075953

[51] Int. Cl.$^6$ ........................... A21D 13/08; A23L 1/31; B65B 25/16; G07F 11/70
[52] U.S. Cl. .............................. 426/274; 99/325; 99/357; 99/450.4; 99/450.5; 426/231
[58] Field of Search ................................ 99/450.1–450.5, 99/325, 326, 334, 352, 355, 357, 443 C, 443 R, 494; 426/274, 275, 231; 364/477, 478, 400; 392/82; 221/150 A, 150 R, 124, 151; 219/388

[56] References Cited

U.S. PATENT DOCUMENTS

| | | | |
|---|---|---|---|
| 3,183,856 | 5/1965 | Jolly | 99/450.4 |
| 3,364,878 | 1/1968 | Kobori, et al. | 99/450.4 |
| 3,783,772 | 1/1974 | Fay | 99/450.7 |
| 3,859,904 | 1/1975 | Carriazo | 99/450.4 |
| 4,202,260 | 5/1980 | Weger | 99/450.4 |
| 4,513,656 | 4/1985 | Fay | 99/450.7 |
| 4,944,218 | 7/1990 | Cresson | 99/357 |
| 5,101,716 | 4/1992 | Cones, Sr. et al. | 99/450.5 |
| 5,113,754 | 5/1992 | Robinson et al. | 99/326 |
| 5,365,835 | 11/1994 | Naramura | 99/450.5 |

*Primary Examiner*—Timothy F. Simone
*Attorney, Agent, or Firm*—Christopher R. Pastel; Thomas R. Morrison

[57] ABSTRACT

A sandwich preparation apparatus includes a food material conveyor having an upstream end region and a downstream finishing end region. The bottom part of a sandwich or burger, including a bun half or slice of bread, has sauces and condiments, and a patty if necessary, automatically added by a first automatic fixing section in the upstream end region. The upper part of the sandwich, optionally including additional sauces, condiments, and patties, is completed by a second automatic fixing section in the downstream finishing end region. Between the two regions is a manual fixing section for an operator to manually add various food materials to the sandwich. The operator controls the automatic fixing sections through first and second input devices and an order display device. The operator is able to change the order or sequence of sandwiches between the upstream end region and the downstream end region using the second input device. The operator is thus able to make allowances for different cooking or preparation times for different types of sandwiches.

15 Claims, 10 Drawing Sheets

5,540,943

SANDWICH PREPARATION APPARATUS

BACKGROUND OF THE INVENTION

The present invention relates to a sandwich preparation apparatus that incorporates a system that automates the process of adding various food materials, such as patties, condiments, and sauces to make a variety of hamburgers and other sandwiches.

Conventional hamburgers have a meat patty in a bun along with various condiments and sauces. A variety of other types of hamburgers and sandwiches have recently become popular and are in high demand at food outlets. These include, for example, such items as the teriyaki burger (adding teriyaki sauce to a conventional hamburger), bacon and lettuce burgers, cheeseburgers with different types of cheeses, barbecue sauce burgers, fish sandwiches, chicken sandwiches, and roast beef sandwiches. New types and kinds of products are being introduced regularly. The words "hamburger" and "sandwich" are interchangeably used in this specification unless otherwise specified.

A demand for increased productivity has arisen as a result of an increase in the number of consumers and increasingly diversified tastes. Conventional kitchen facilities include a freezer for meat, fish, or chicken, a refrigerator for condiments, a broiler or grill for cooking food, a toaster for buns, a deep fat frier, and a work table for adding sauces and condiments to the sandwiches.

Most of the preparation is manually performed. Each section is independent of the others. In a small commercial kitchen, one person cooks the food. Another person prepares the buns, and adds sauces and condiments. Still another person makes french fries, wraps the food, and does various other jobs. Conventional kitchen productivity has been examined, analyzed, and improved many times, and it is very difficult to make any more improvements.

The automated hamburger fixing apparatus has been developed to increase efficiency and reduce the required manual labor. For example, the apparatus disclosed in Japanese Laid Open Patent Publication No. 1-91739 attempts to overcome the problems inherent in manual systems. This apparatus uses a feeding and adding mechanism for each different condiment or sauce. The application of the apparatus is very limited due to the space required for the feeding and adding mechanisms. Changes are unwieldy due to the need to add another feeding and adding mechanism every time a new sauce or condiment is added to the menu. In addition, the control system has to be modified every time a change is made. It is impossible to install such an apparatus in a small conventional kitchen.

OBJECTS AND SUMMARY OF THE INVENTION

Accordingly, it is an object of the present invention to provide a sandwich fixing apparatus which overcomes the drawbacks and limitations of the prior art.

It is a further object of the present invention to provide a sandwich preparation apparatus which is relatively small and is capable of preparing a variety of hamburgers and sandwiches.

It is a still further object of the present invention to provide a sandwich preparation apparatus which provides the ability to make allowances for different cooking or preparation times for different types of sandwiches.

Briefly stated, a sandwich preparation apparatus includes a food material conveyor having an upstream end region and a downstream finishing end region. The bottom part of a sandwich or burger, including a bun half or slice of bread, has sauces and condiments, in addition to a patty, if requested, automatically added by a first automatic fixing section in the upstream end region. The upper part of the sandwich, optionally including additional sauces, condiments, and a patty, if necessary, is completed by a second automatic fixing section in the downstream finishing end region. Between the two regions is a manual fixing section for an operator to manually add various food materials to the sandwich. The operator controls the automatic fixing sections through first and second input devices and an order display device. The operator is able to change the order or sequence of sandwiches between the upstream end region and the downstream end region using the second input device. The operator is thus able to make allowances for different cooking or preparation times for different types of sandwiches.

According to an embodiment of the invention, a sandwich preparation apparatus includes a food material conveyor having an upstream end region and a downstream end region, a first automatic preparing section located at the upstream end region, a second automatic preparing section located at the downstream end region, a manual preparing section located between the upstream starting end region and the downstream end region, first and second input systems, the first input system including means for controlling the first automatic preparing section, the second input system including means for controlling the second automatic preparing section, means for displaying a plurality of ordered items on a display in response to the first input system, and the means for displaying including means responsive to the second input system for changing the display of a selected one of the plurality of ordered items.

According to a feature of the invention, the means for displaying in the sandwich preparation apparatus includes an order display device.

According to another feature of the invention, the first input system of the sandwich preparation apparatus includes a first item pad for inputting a designated food item into the order display device, a first quantity pad for inputting a quantity of the designated food item into the order display device, first means for showing the quantity inputted, first means for canceling the input, and first means for confirming the input whereupon the designated food item and quantity are displayed on the order display device.

According to an additional feature of the invention, the second input system includes a second item pad for inputting a designated food item into the order display device, a second quantity pad for inputting a quantity of the designated food item into the order display device, second means for showing the quantity inputted, second means for canceling the input, and second means for confirming the input whereupon the designated food item and quantity are removed from the order display device.

According to another embodiment of the invention, an apparatus for preparing a sandwich includes means for conveying food material from an upstream end region to a downstream end region, first means for automatically preparing substantially all of a bottom half of the sandwich, second means for automatically preparing substantially all of a top half of the sandwich, a manual preparing section located flow-wise between the first automatic preparing means and the second automatic preparing means, first means for inputting an order for the sandwich, second means for inputting information about the sandwich, the first input means including means for controlling the first automatic preparing means, the second input means including means for controlling the second automatic preparing means, means for displaying a plurality of ordered items on a display in response to the first input means, and the means for displaying including means responsive to the second input means for changing the display of a selected one of the plurality of ordered items.

The present invention has the following advantages:

(A) Fixing various kinds of hamburgers and sandwiches.

The operator's operation of the input keyboard of the first input system causes the order display device to display an item which has been ordered and starts the first automatic feeding mechanism, thereby feeding food materials onto a bun half (either a crown or a heel). Other food materials necessary to complete the ordered item are manually added in a prescribed order on the portion which has been delivered to a manual preparing section by the first automatic feeding mechanism.

Upon completion of the manual feeding job and subsequent operation of the input keyboard of the second input system, the display showing the ordered item just completed on the order display board turns off. At the same time, responsive to this input, the second automatic feeding mechanism begins prescribed actions to feed any necessary food materials onto the portion which just left the manual preparing section.

The sandwich preparation apparatus of the present invention can make various kinds of hamburgers and sandwiches. Some examples are shown below.

(1) Teriyaki burger

By the first automatic feeding mechanism:

A heel is fed out and placed on the conveyor, a sauce or condiment (teriyaki sauce) is added, and then a patty is placed on the heel.

By the operator:

A seasoning (teriyaki sauce) and then lettuce are put in order on top of the partially completed order.

By the second automatic feeding mechanism:

Finally, another sauce or condiment (mayonnaise) followed by a crown are added in that order to complete the order.

(2) Fried fish sandwich

By the first automatic feeding mechanism:

A heel is fed from the bun stocker, toasted, and placed on the conveyor.

By the operator:

A fried fish patty and other foodstuffs, if necessary, are placed on the heel.

By the second automatic feeding mechanism:

Finally, some sauces or condiments (cocktail sauce and tartar sauce) and a crown are added to complete the order.

(3) Conventional hamburger

By the first automatic feeding mechanism:

A heel is placed on the conveyor and a patty is placed on the heel.

By the operator:

A vegetable (onion) and pickles are placed in that order on the patty.

By the second automatic feeding mechanism:

Finally, some sauces or condiments (ketchup and mustard) and a crown are added to complete the order.

(4) Cheeseburger

By the first automatic feeding mechanism:

A heel is placed on the conveyor and a patty is placed on the heel.

By the operator:

A vegetable (onion), a pickle, and cheese are placed in that order on the patty.

By the second automatic feeding mechanism:

Finally, some sauces or condiments (ketchup and mustard) and a crown are added to complete the order.

(B) Installable in a conventional, relatively small kitchen

As described in section (A) above, various kinds of sandwiches and hamburgers can be fixed in one line. As a result, the sandwich preparation apparatus can be small in size. Therefore, this apparatus can be installed in a conventional, rather small, kitchen.

(C) Heightened productivity

As described above, ordered sandwiches and hamburgers can be prepared in sequence by the first automatic feeding mechanism, an operator, and then the second automatic feeding mechanism. A second item ordered may complete the manual preparation stage before the first ordered item. For example, if the first ordered item is a fried fish sandwich and the second ordered item is a hamburger, the hamburger will be completed before the fried fish patty. In the present invention, the second automatic feeding mechanism works in response to the input operation to the second input system and is independent of the first automatic feeding mechanism. The second ordered item which finishes the manual preparation stage before the first ordered item can be sent to the second automatic feeding mechanism without waiting for the first ordered item. In other words, various types of sandwiches and hamburgers can be prepared one after another without being affected by waiting time. Productivity is thus enhanced.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

In general, a sandwich preparing apparatus according to the present invention includes a patty grilling system, a bun toasting system, an assembling system, and a wrapping system. These systems are described below.

Patty Grilling System

Figure 3:
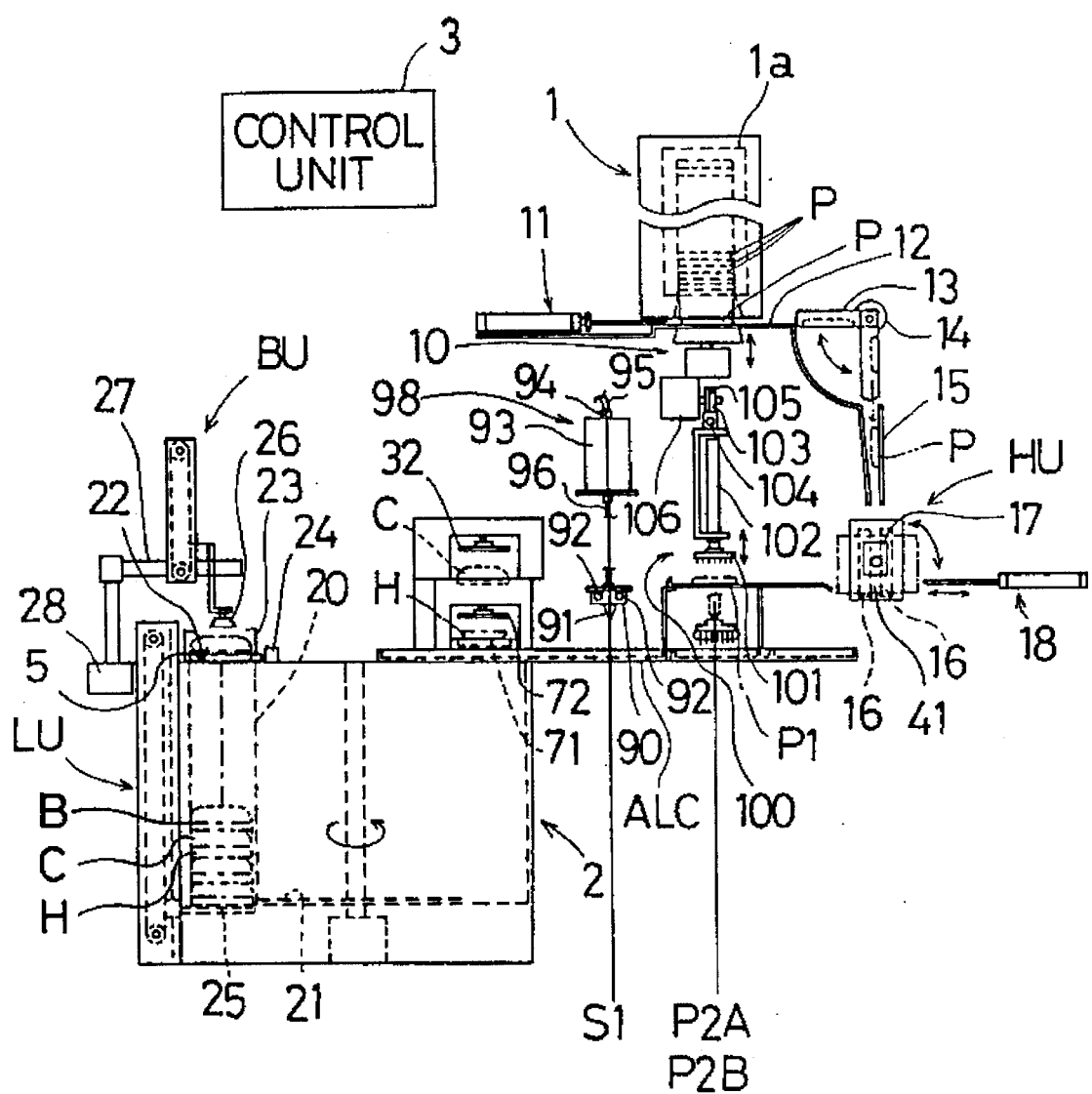
FIG. 3 is a side view of the sandwich preparation apparatus of FIG. 1.

Referring to FIG. 3, a plurality of frozen patties P are stacked inside a changeable magazine 1a inside a patty freezer 1. Patties P can include chopped meat, chicken, fish, vegetables, or other food materials. Different magazines 1a can be substituted to contain different types of patties P. In an alternative embodiment, patty freezer 1 does not contain a magazine and the patties P are stacked by hand. Patties P are supported by an elevating unit 10. In response to a signal from a control unit 3, elevating unit 10 lowers to a position where a bottom patty P' is moved laterally by a pusher 11 to a guide 12 and into a position changing box 13. A rotary actuator 14 rotates position changing box 13 through 90°, allowing patty P to fall into a heating unit HU through a vertical guide 15. Rotary actuator 14 then returns to its original position and waits to receive another patty.

A heating unit stopper 41 inside heating unit HU stops patty P and signals control unit 3 that a patty is in position to be cooked. Control unit 3 activates a pair of ceramic heaters 16 which press and cook patty P. At a predetermined time, control unit 3 deactivates ceramic heaters 16 and activates a second rotary actuator 17. Second rotary actuator 17 rotates heating unit HU 90° so patty P is once again horizontal and ready to be pushed from heating unit HU by second pusher 18.

Figure 1:
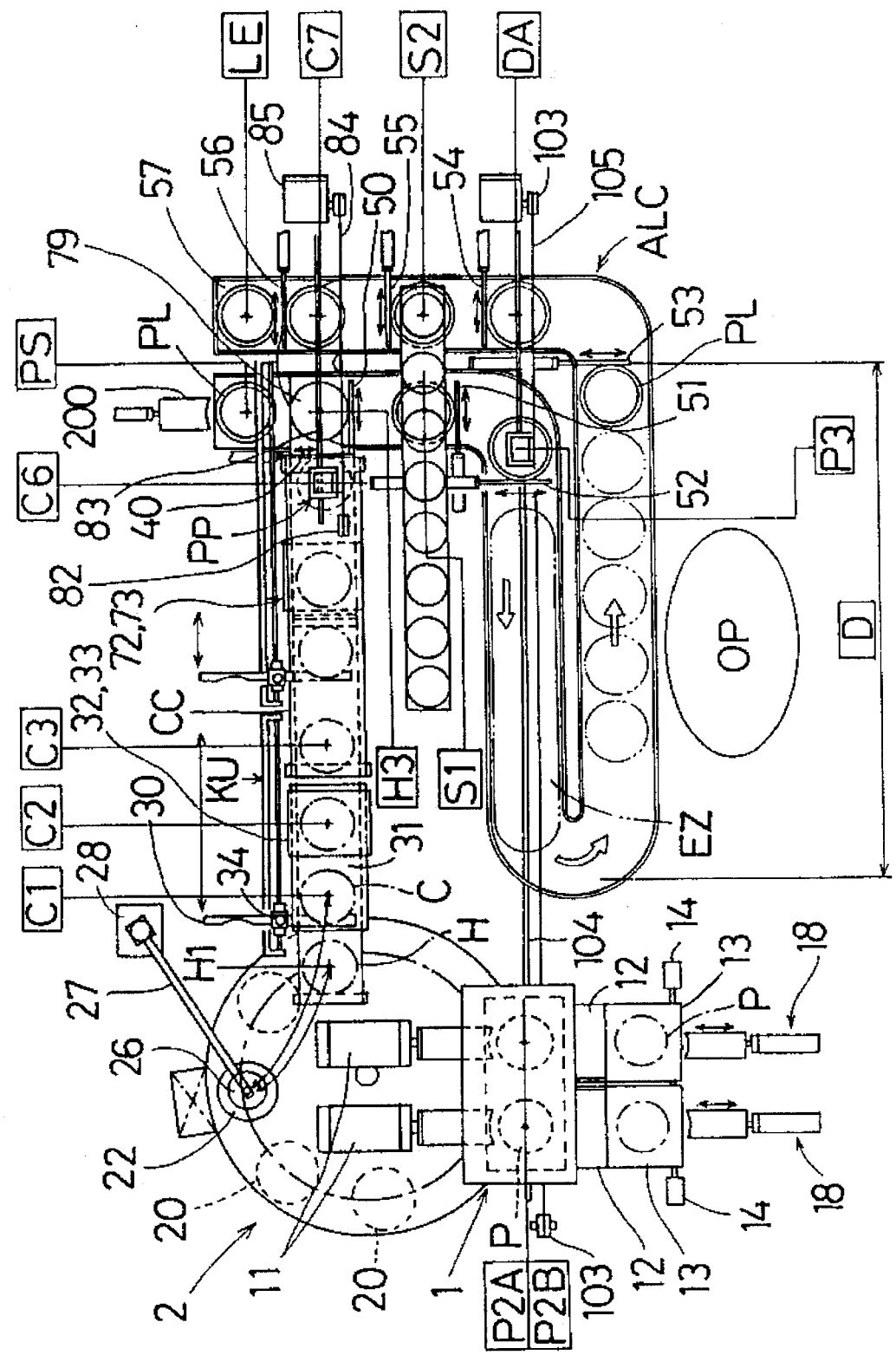
FIG. 1 is a plan view of a sandwich preparation apparatus according to an embodiment of the present invention.

Referring to FIGS. 1 and 3, second pusher 18 moves the cooked patty P to a pick-up position P2A in response to a signal from control device 3. In this embodiment, two patty grilling systems are in use. A second patty is cooked and moved to position P2B. The number of patty grilling systems in use can vary with the size of the preparing operation.

Bun Toasting System

Figure 2:
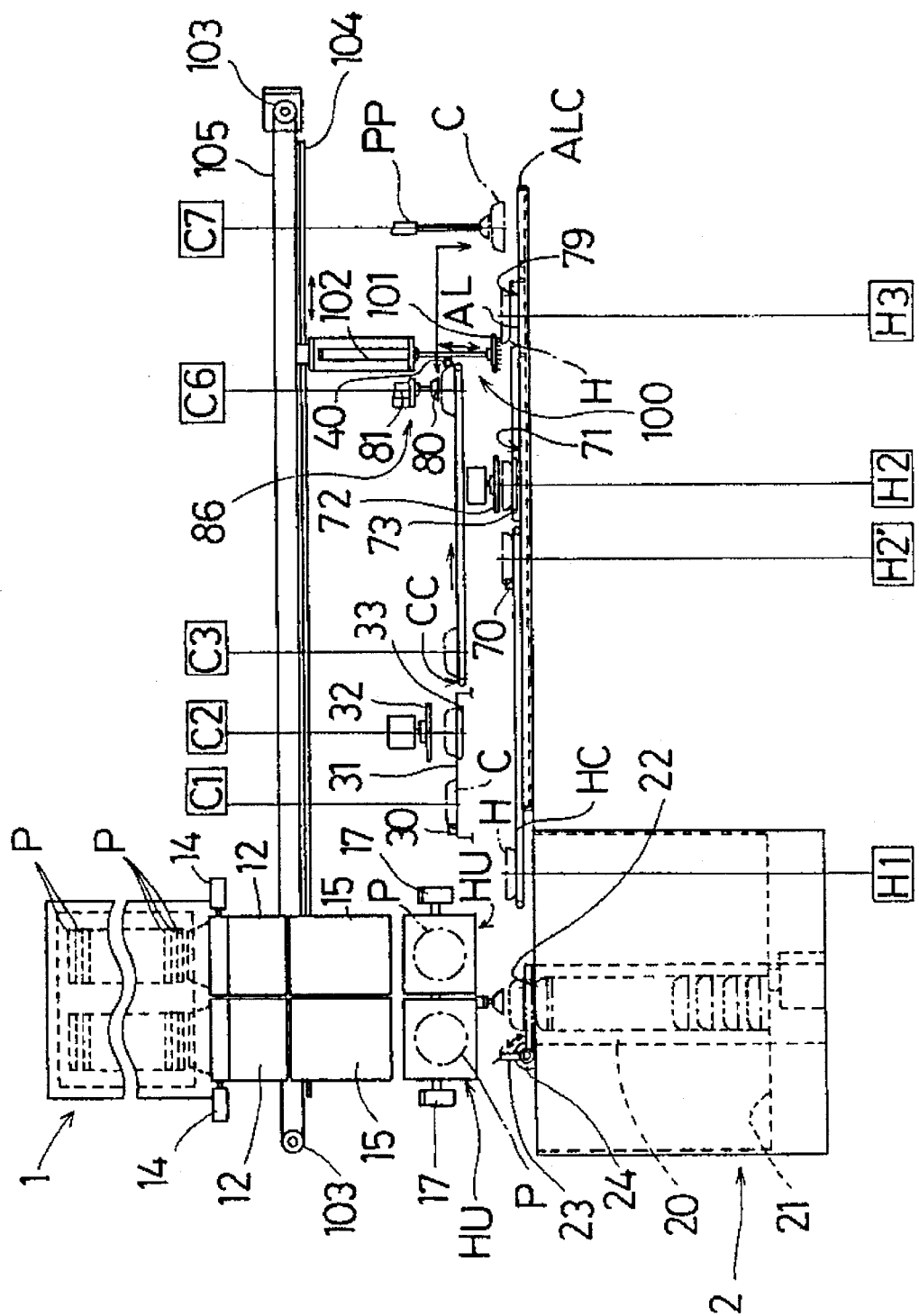
FIG. 2 is a front view of the sandwich preparation apparatus of FIG. 1.

Referring to FIGS. 1–3, a plurality of buns B are stored in a bun magazine 20. Each bun B consists of a heel H and a crown C. A plurality of bun magazines 20 fit on a rotary unit 21 inside a bun stocker 2. In a preferred embodiment, eight bun magazines are used in bun stocker 2. An outlet 22 on a top of bun stocker 2 has a cover plate 23 which is normally in a closed position. Bun stocker 2 is kept at preferred humidity and temperature conditions to keep buns B as fresh as possible.

A lifting unit LU, controlled by control device 3, elevates a lifting arm 25 in response to an order for a sandwich. As lifting arm 25 begins to move, a third rotary actuator 24 raises cover plate 23 to an open position. A lifting unit sensor 5 senses when lifting arm 25 has raised bun B to a position where crown C and heel H are outside bun stocker 2. At this point, control device 3 stops further motion of lifting arm 25.

A vacuum head 26 is lowered to a position just above crown C by vacuum elevating unit BU. A swivel arm 27 moves vacuum head 26 into position with crown C. Vacuum head 26 picks up crown C. A fourth rotary actuator 28 swings swivel arm 27 through a predetermined angle to place crown C at a position C1. Swivel arm 27 and vacuum head 26 then release crown C and return to their original position and pick up heel H. Heel H is placed at position HI.

A driving unit KU moves shift arm 30 from position C 1 to a position C2. Crown C is thus moved by shift arm 30 along a toasting base 31 from position C1 to crown toasting position C2. An upper crown toasting heater 32 is disposed above crown toasting position C2. A lower crown toasting heater 33 is disposed below toasting position C2. The programming of the operation sequence of driving unit KU also includes the movement of shift arm 30 from position C2 to position C3, so that a crown, which has been toasted at position C2 by upper and lower crown toasting heaters 32 and 33 is transferred to position C3. When shift arm 30 returns to position C1 from position C3, shift arm 30 is rotated 180 degrees by a fifth rotary actuator 34 to avoid interfering with the next crown at position C1.

Toasted crown C is next conveyed to a position C6 by a crown conveyor CC. Crown C waits at position C6 to be picked up and put in an assembly line. At this stage, crown C is kept from moving by a stopper 40. If another crown C occupies position C6, the moving crown C stops after making contact with the other crown C. If other crowns follow them, they are stopped in line and sequentially accumulated on crown conveyor CC in what is referred to as an "accumulated state". In this embodiment, the accumulating capacity is four crowns. A heat-retaining mechanism incorporating a heater such as, for example, an infra-red heat source, is preferably used to prevent crowns C from getting cold while in an accumulated state.

Heel H is moved forward to a position H2' by a heel conveyor HC which is powered by a driving unit (not shown). A heel shift arm 70 cooperates with the driving unit in the same manner as driving unit KU and shift arm 30 cooperate for crowns C as described above. Heel shift arm 70 moves heel H to position H2 where heel H is toasted between upper and lower heel toasting heaters 72 and 73. Toasted heels H are transferred onto an assembly line conveyor ALC without being accumulated the way the crowns C are. After toasting, heel H moves to a position H3 and waits to be transferred onto the assembly line. The transfer of heels H onto the assembly line is performed differently from the transfer of crowns C onto the assembly line.

Figure 5:
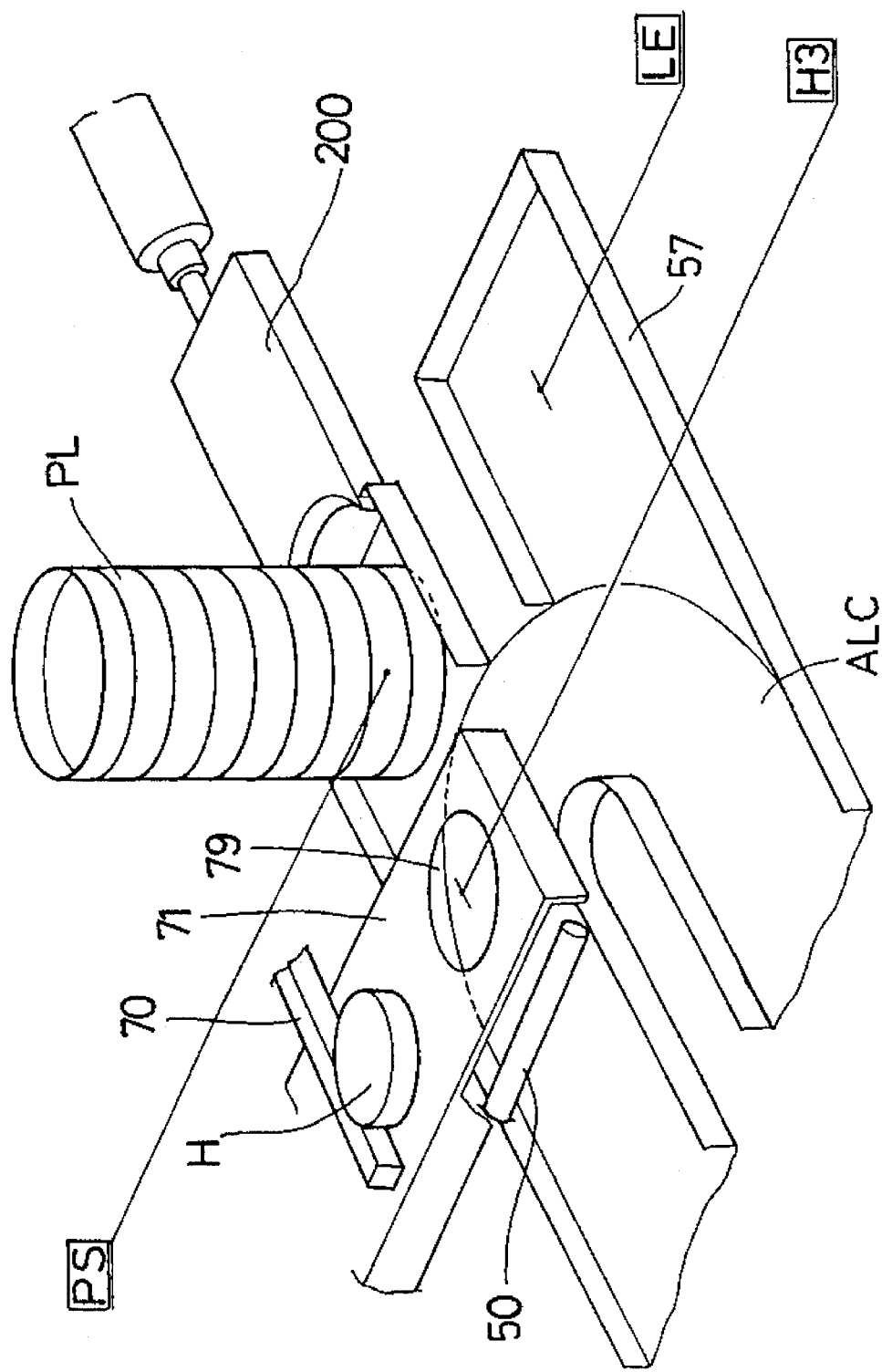
FIG. 5 is a perspective view near a starting end of an assembly line conveyor according to the embodiment of FIG. 1.

Referring to FIGS. 1 and 5, a heel shift table 71 has a heel drop hole 79 at a place corresponding to position H3. When heel H reaches position H3, it falls through drop hole 79 onto a pallet PL positioned immediately below hole 79 on assembly line conveyor ALC.

It should be clear from the above that the position of heels and crowns may be reversed in the process, with crown C placed at position H3 and heel H placed at position C6. That is, heels can be on the bottom or top, and crowns can be on the top or bottom, respectively. The bottom element (either a heel or a crown) has its cut face facing upward, and the top element (either a crown or a heel) has its cut face facing downward.

Assembling System

Sandwiches are assembled as pallet PL is transferred by assembly conveyor line ALC from a position just under position H3, where it receives a heel H, to a position C7, where a crown C is placed on the top to complete the sandwich. During the intervening journey, requested food materials are added one on top of another at respective positions. An arbitrary number of pallets PL are placed on assembly line conveyor ALC. Conveyer ALC is continuously driven at a constant speed in one plane in a substantially L-formed track.

The assembling process begins when heel H drops onto pallet PL after being toasted. A positioning stopper 50 is released, and pallet PL is moved toward a next position S1 by conveyor ALC. When a sensor (not shown) detects the approach of pallet PL to position S1, a pallet stopper 51 is actuated and positions pallet PL at position S1.

Figure 4:
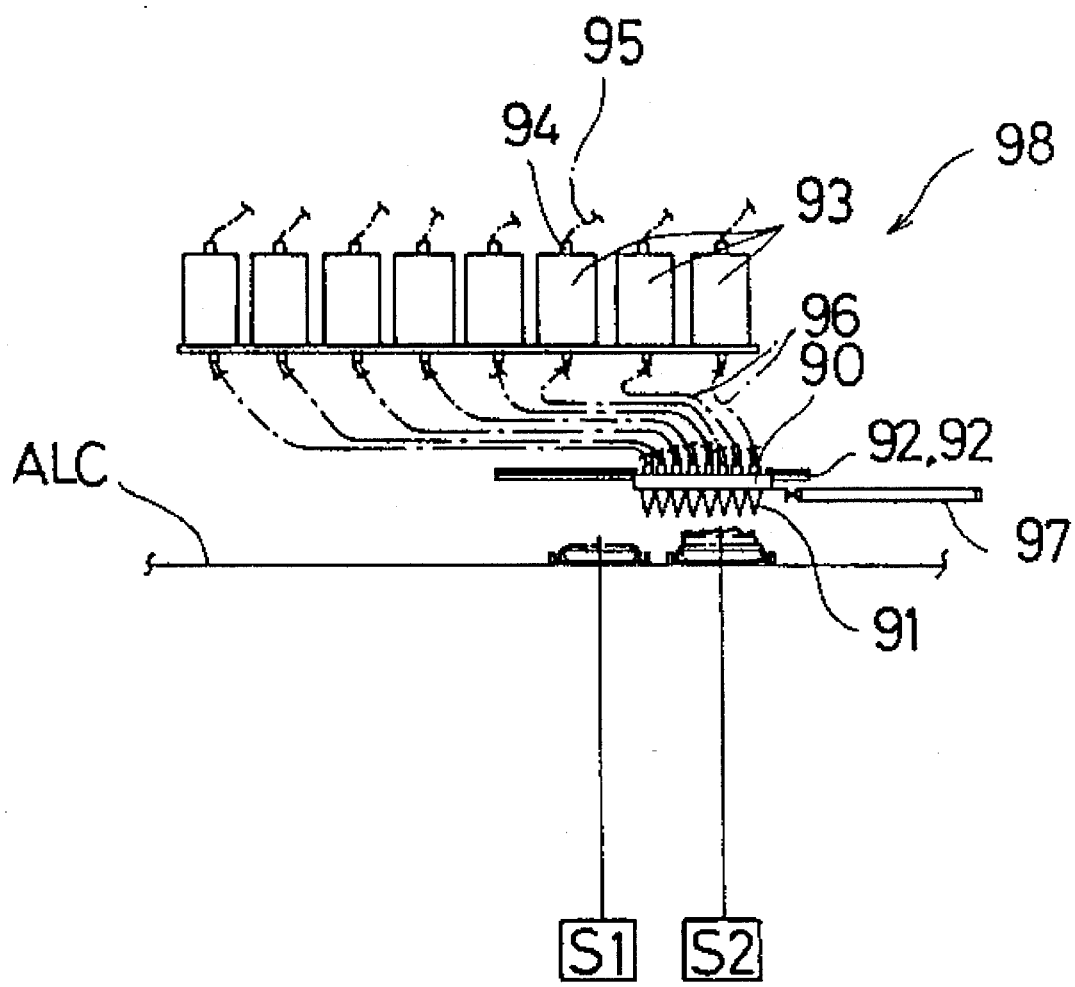
FIG. 4 is a side view of an embodiment of a sauce dispensing apparatus used in the present invention.

Referring now to FIG. 4, when pallet PL is positioned at position S1, sauce dispensing apparatus 98 is activated by control unit 3 to add sauces and condiments to heel H. A shift actuator 97 moves a manifold 90 along a shift guide 92. Manifold 90 includes a plurality of discharge nozzles 91, one discharge nozzle 91 for each different type of condiment or sauce. Each discharge nozzle 91 is connected to a respective sauce tank 93 by a discharge tube 96. Typical sauces or condiments include, but are not limited to, steak sauce, teriyaki sauce, hot sauce, chile sauce, mayonnaise, tartar sauce, pickle relish, India relish, ketchup, chopped onions, and mustard. When the appropriate discharge nozzle 91 for the requested sauce is centered over heel H on pallet PL, compressed air injected into sauce tank 93 through a connector 94 and an air tube 95 forces the sauce out. Control unit 3, in response to a customer's request, can add more than one sauce or condiment to heel H.

Discharge nozzle 91 may be opened and closed by any convenient means such as, for example, an air pressure or electric actuator. Injecting compressed air into sauce tank 93 opens discharge nozzle 91. In an air actuator, when injection of compressed air stops, discharge nozzle 91 closes. In this embodiment, controlling the air pressure and the injecting time controls the amount of sauce discharged from discharge nozzle 91. Appropriate pressures and times are set depending on the kinds of sauces being used, and optionally by demands of a customer.

Referring now to FIG. 1, pallet stopper 51 is released by control unit 3 after the necessary sauces or condiments are added on heel H. Pallet PL then moves to a position P3 on conveyor ALC. When a sensor (not shown) detects the approach of pallet PL to position P3, stopper 52 stops and positions pallet PL at position P3. Some sandwiches need no sauce or condiment at position S1. In this case, control unit 3 causes pallet PL to pass from position H3 through position S1 without stopping at position S1 and to move directly to position P3.

Referring to FIGS. 2 and 3, a lifting and placing mechanism 100 includes a lifting cylinder 102, a sprocket 103, a guide rail 104, a rotating wire 105, a driving motor 106, and a head 101. Head 101 has tines or prongs to engage patty P. Lifting and placing mechanism 100 moves a grilled patty from its waiting position at position P2A or P2B onto heel H at position P3. Lifting and placing mechanism 100 can also move a grilled patty onto a partially completed order at position DA. Some sandwiches need no patty at position P3. In this case, control unit 3 passes pallet PL through this position directly to a zone D. Referring to FIG. 1, when patty P is placed on pallet PL, stopper 52 is released and pallet PL moves to zone D. At the downstream end of zone D, a stopper 53 prevents pallets PL from moving unless released by an operator OP. Zone D is capable of holding a number of pallets PL. Zone D is used for operator OP to add items not otherwise installed or to reposition pallets as necessary. Heels H on pallets PL are supplemented with food materials according to the order. For instance, if a patty P was not previously added, a food material such as fish, chicken, or croquette is added. Condiments not contained in sauce tanks 93 such as lettuce, onion slices, cheese slices, and pickle slices are added manually by operator OP. Operator OP uses an order display system to check the pallets PL in zone D against what has been ordered and to determine what, if anything, should be added to complete the order. The order display system is described below.

When operator OP finishes adding the required food materials, operator OP releases stopper 53 to allow pallets PL to move to "dummy" position DA. Pallet PL stops at dummy position DA according to the cooperation of a sensor (not shown) and a stopper 54 in the same manner as at positions S1 and P3. Dummy position DA is used for sandwiches which need a patty (as in a double-burger) after the addition of a side food material in zone D. If the pallet PL needs no additional food item at this position, pallet PL passes through this position to a position S2.

At position S2, pallet PL stops according to the cooperation of a sensor (not shown) and a stopper 55 in the same manner as at the previous position. At position S2, additional sauces and condiments are added as necessary to the food item in pallet PL by sauce dispensing apparatus 98 in the manner previously described for adding sauces at position S1. Control unit 3, in response to a customer's request, can add more than one sauce or condiment to the food item in pallet PL.

Referring also to FIG. 2, when the addition of sauces and condiments is completed at position S2, stopper 55 is released and pallet PL moves to a position C7. Pallet PL is positioned at position C7 by cooperation of a sensor (not shown) and a stopper 56. A lifting mechanism 86 includes a vacuum head 80 at its tip, an elevation cylinder 81, a sprocket 82, a guide rail 83, a rotating wire 84, and a driving motor 85. At position C7, crown C, which is now toasted and waiting at position C6, is picked up by vacuum head 80. Lifting mechanism 86 then places crown C on the food item in pallet PL. When crown C is added at position C7, control unit 3 releases stopper 56 and pallet PL moves to a position LE along a discharge guide 57 by conveyor ALC.

Order Display System

Figure 6:
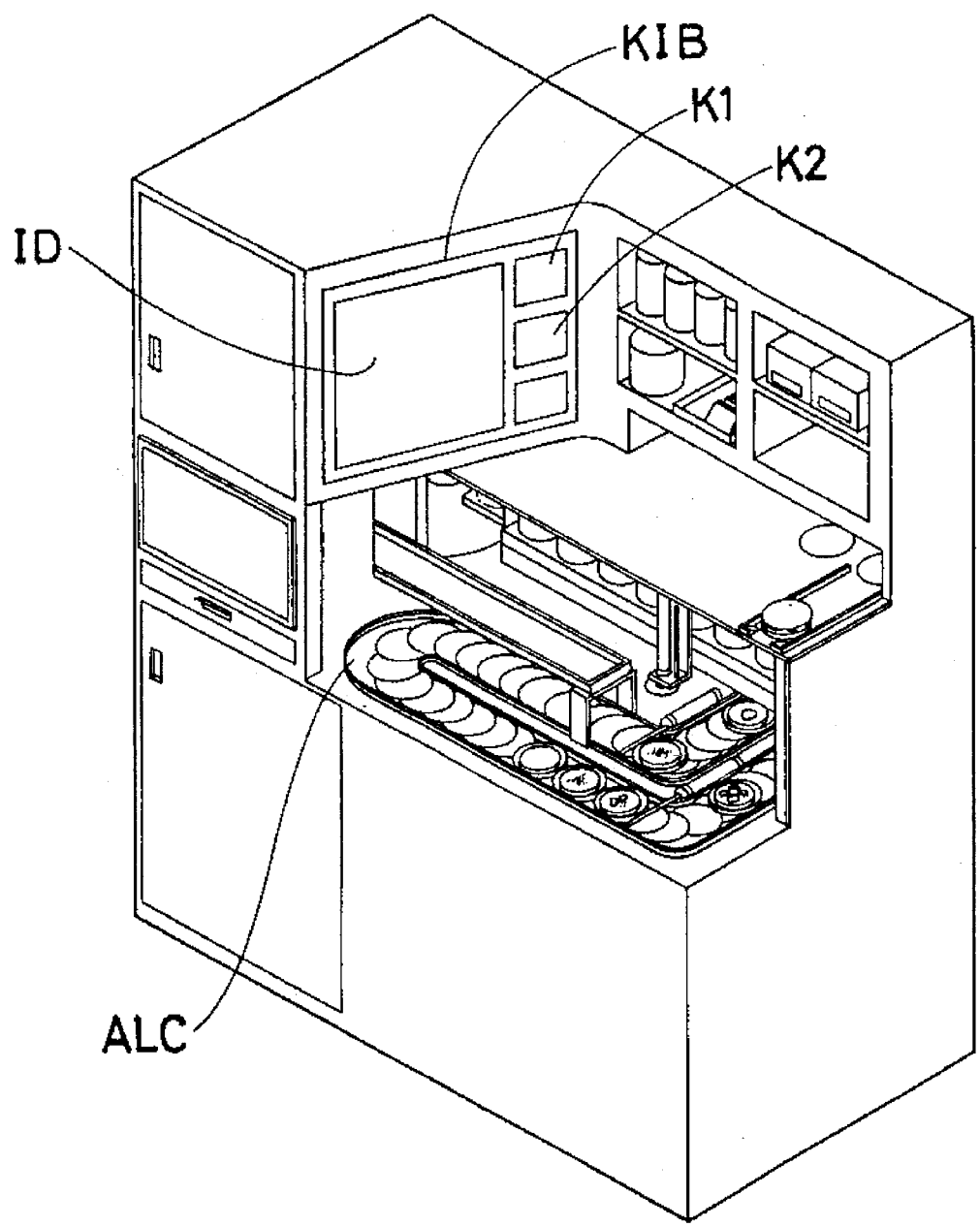
FIG. 6 is a perspective view of a kitchen unit incorporating an embodiment of the present invention.
Figure 7:
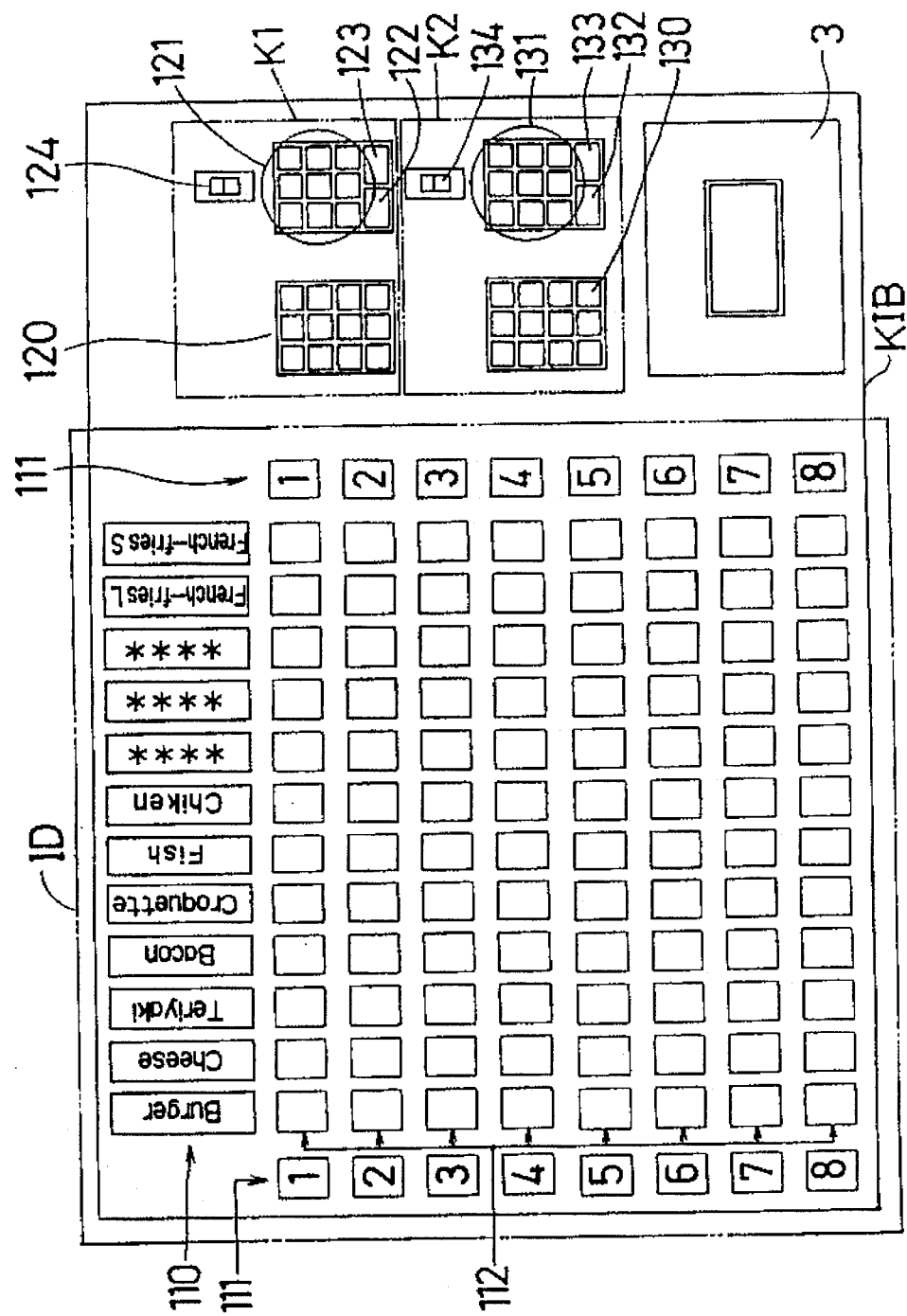
FIG. 7 is a diagram of an order display device according to an embodiment of the present invention.

Referring to FIGS. 6 and 7, an input/display board KIB assists operator OP in managing the automatic feeding mechanisms of the invention. An order display device ID on input/output board KIB displays information concerning the sandwich ordered. Such information includes the type and quantity of sandwiches ordered. Control unit 3 automatically keeps track of the customer orders. Orders appear on order display device ID as orders are placed and drop off order display device ID as they are completed and delivered. An input key device K1 allows operator OP to enter information into control unit 3 to control a first automatic fixing section which includes the various sensors, pushers, and stoppers, the action of sauce dispensing apparatus 98 at position S1, and lifting and placing mechanism 100 at position P3 upstream of zone D. An input key device K2 allows operator OP to enter information into control unit 3 to control a second automatic fixing section which includes the various sensors, pushers, and stoppers, as well as the action of sauce dispensing apparatus 98 at position S2 and lifting and placing mechanism 100 at position DA downstream of zone D. Zone D is considered a manual fixing section.

In this embodiment, first item pad 120 of input key device K1 includes twelve keys that correspond to different types of food items ordered. These keys correspond to the items in an item list 110 in order display device ID. Keys one to seven can represent, for example, hamburger, cheeseburger, teriyaki burger, bacon burger, croquette sandwich, fried fish sandwich, and chicken fillet sandwich. The representations can easily be changed by programming control unit 3. Operator OP presses the appropriate key for the item ordered and then enters the quantity ordered using a first quantity pad 121. First quantity pad 121 has keys numbered one through nine. In this embodiment, single-digit quantities are accommodated. Quantities greater than nine are treated as separate orders. Two-digit, or three-digit quantities can be used, provided that an "enter" key (not shown) is also included.

The quantity entered appears as a number in a quantity grid 112 of order display device ID in the row corresponding to the customer order number. The column in quantity grid 112 in which the quantity appears corresponds to the type of item ordered and entered via first item pad 120. The quantity also appears in first confirmation display 124 of input key device K1. Operator OP verifies that the quantity entered is correct and continues to enter the remainder of the customer's order. After the entire order is entered, operator OP presses first confirmation key 122. If a mistake is made any time during the entering of the order, operator OP presses first cancel key 123 and re-enters the order. The displays use any conventional means for displaying numbers such as a seven segment LED or LCD.

Pressing first confirmation key 122 starts the associated systems of the sandwich preparation system. The first automatic fixing system (the upstream side of zone D) delivers pallets containing toasted heels and the appropriate sauces and condiments, and possibly a patty, to zone D where operator OP adds food materials according to the order. As described above, if a patty P was not previously added, a food material such as fish, chicken, or croquette may be added in zone D. Condiments not contained in sauce tanks 93 such as lettuce, onion, cheese, and pickles are added manually by operator OP. Operator OP uses order display device ID to check the pallets PL in zone D against what has been ordered and determine what should be added to complete the order.

Operator OP uses input key device K2 to control the second automatic fixing section downstream of zone D. Similar to input key device K1, input key device K2 includes a second item pad 130, a second quantity pad 131, a second confirmation key 132, a second cancel key 133, and a second confirmation display 134. Second item pad 130, second quantity pad 131, second confirmation display 134, and second cancel key 133 work in the same manner as their counterparts in input key device K1. However, second confirmation key 132, in addition to releasing stopper 53 and starting the second automatic fixing section, causes the number in quantity grid 112 of order display device ID to go out. Input key device K2 enables the operator to move items in zone D out of their sequential order. This ability increases operator OP's flexibility in completing orders and greatly enhances productivity.

For example, if a customer orders three fried fish sandwiches and four cheeseburgers, operator OP presses the key for "fish" on first item pad 120, presses the key for "3" on first quantity pad 121, and verifies the quantity on first confirmation display 124. Operator OP then presses the key for "cheeseburger" on first item pad 120, presses the key for "4" on first quantity pad 121, and verifies the quantity on first confirmation display 124. Since no input errors have been made, operator OP presses first confirmation key 122 to start the first automatic fixing section. Operator OP continues to input other customer orders as they come in.

When the seven pallets PL containing the heels and sauces for the three fried fish sandwiches and the heels, sauces, and patties for the four cheeseburgers, arrive in zone D in that order or sequence, and are stopped by stopper 53, operator OP looks at order display device ID to see what ingredients have to be added manually. If some of the ingredients are not ready, such as the fried fish fillet not being finished cooking, the progression of all pallets PL does not have to stop. Operator OP takes the three pallets PL containing the partially completed fried fish sandwiches and moves them behind the four pallets PL containing the four cheeseburgers.

After adding the cheese and any other ordered condiments which have to be added manually onto the partially completed cheeseburger, operator OP presses the key for "cheeseburger" on second item pad 130, presses the key for "4" on second quantity pad 131, and verifies the quantity on second confirmation display 134 before pressing second confirmation key 132. Pressing second confirmation key 132 causes the "4" on quantity grid 112 that is in column "cheeseburger" and the row of the order number to go out, and also releases stopper 53 so that the four cheeseburger pallets PL continue downstream. Control unit 3 now expects the four cheeseburgers to enter the second automatic fixing section and controls the downstream side of the process accordingly.

If the food materials to be added are not ready, operator OP can remove the appropriate pallets PL from assembly line conveyor ALC to an escape zone EZ to allow other orders to be processed. When the materials to be added are ready, operator OP adds the materials and moves the pallets PL back onto assembly line conveyor ALC. For example, when the fried fish fillets are ready, operator OP places them on the fried fish sandwich pallets PL, positions them on assembly line conveyor ALC, and presses the "fish" key on second item pad 130 followed by the "3" key on second quantity pad 131. After verifying the quantity on second confirmation display 134, operator OP presses second confirmation key 132. The "3" on quantity grid 112 on the customer order row in the "fish" column goes out, and stopper 53 is released. Control unit 3 now expects three fried fish sandwiches to enter the second automatic fixing section and controls the downstream side accordingly.

Wrapping System

Pallet PL and the completed food item is transferred from position LE to a wrapping position by a chute or other conveying means. The sandwich on pallet PL, which has been through all necessary processes, is either wrapped using an automatic wrapping system or manually removed and wrapped. An automatic wrapping system (not shown) includes, for example, an upper suction device and a lower suction device. An upper side of a sandwich bag is pulled upward by the upper suction device and a lower side of the sandwich bag is pulled downward by the lower suction device. The completed sandwich is pushed into the now open sandwich bag. Empty pallet PL is then transferred to position PS where it waits to be fed into assembly line ALC.

Referring to FIG. 5, empty pallets PL are stacked at a position PS. When control unit 3 receives a signal indicating that there is no pallet PL at position H3, it enables a pusher 200 to push a pallet from the bottom of the stack at position PS to position H3 on conveyor ALC.

The above description of the assembling system follows only one pallet PL as it travels on assembly line conveyor ALC. In actuality, a number of pallets PL are traveling on assembly line conveyor ALC continuously. In this case, the system operates under the following conditions:

(1) An arbitrary number of pallets PL are waiting for sauce addition or food material addition or are in the process at arbitrary positions on assembly line conveyor ALC.

(2) The time to complete each stage of the process differs for each product. Under these conditions, releasing a stopper in response to a signal that the process in a certain position has been finished does not always allow pallet PL to flow smoothly to a next position. For instance, if the next position in the process is occupied by another pallet, it may not be desirable to advance pallet PL to the next position. Therefore, for the system to handle a number of pallets PL simultaneously, control unit 3 is preferably programmed to receive confirmation signals of "empty" at each position in addition to receiving a signal of "completion" at each position.

When both "completion" and "empty" signals are established (an AND state for a logic gate), the system releases the corresponding stoppers.

In the sandwich preparation apparatus of this embodiment, a variety of hamburgers and sandwiches may be fixed using an assembling system as described above. The apparatus can be installed in a relatively small conventional commercial kitchen. Productivity is also greatly enhanced. Conventionally, three people are needed in a sandwich or hamburger shop. A "meat person" is in charge of grilling patties and frying croquettes, fish fillets, chicken fillets, and the like. A "dress person" is in charge of toasting buns and adding main food materials, side food materials and sauces and condiments. A "finishing person" makes french fries, wraps the completed items, and performs various other tasks. In some instances, only two people are used to perform all the jobs.

By using the present invention, a hamburger shop can reduce the number of people needed to produce hamburgers or sandwiches. In this apparatus, zone D stopper 53 in zone D is designed to be released only when operator OP enters a releasing command into input key device K2. Therefore, when operator OP is away from zone D, pallets PL accumulate successively at stopper 53. Operator OP can thus be away from zone D performing other tasks for short periods of time.

Since in the present invention patties are automatically grilled by the patty grilling system, buns are automatically toasted by the bun toasting system, and wrapping is automated by the wrapping system, a single operator OP can act as the "meat person", the "dress person", and the "finishing person." The labor of two workers is thus saved.

Figure 8:
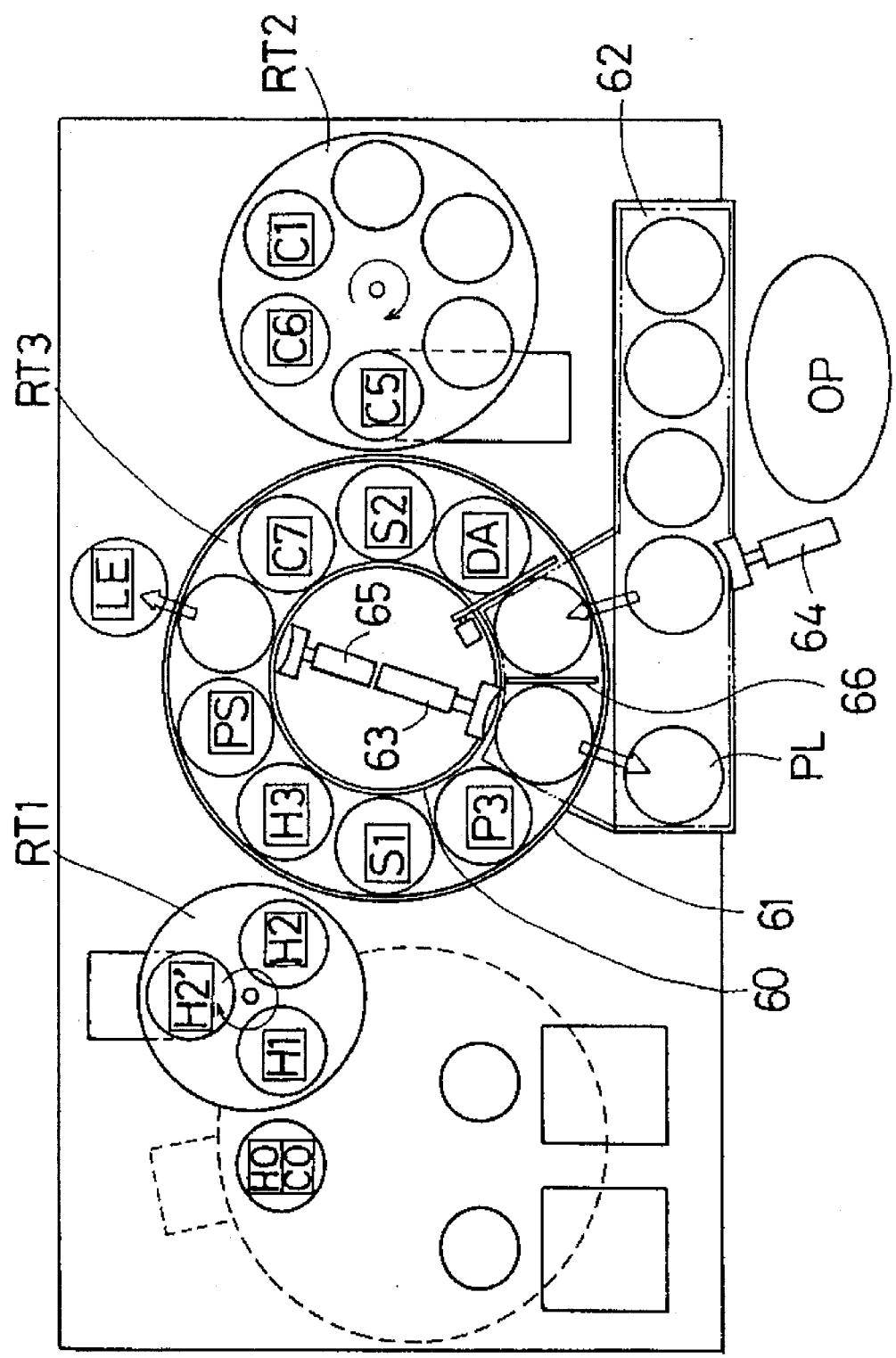
FIG. 8 is fragmentary top view of an alternative embodiment of the present invention.

Referring to FIG. 8, another embodiment of the sandwich preparation apparatus is illustrated. The patty grilling system and the order control systems are the same as described in the previous embodiment. The bun toasting system in this embodiment differs from the embodiment described above, as does the assembling system.

The mechanisms are different for transferring heels H from position H1 to position H2, for conveying crowns C from position C1 to position C6, for feeding heels H from position H2 onto pallets PL at position H3, and for feeding crowns C from position C6 onto pallets at position C7.

The mechanism for transferring heels H from position H1 to position H2 is described. Heels H are picked up at position H0 and placed at position H1 by a swivel arm and vacuum head (not shown) as in the previous embodiment. The horizontal moving range of the swivel arm and vacuum head is from position H0 to position H1 on rotary table RT1, and from position C0 to position C1 on rotary table RT2. Crowns C are picked up from position C0 and placed at position C1 on rotary table RT2 in the same manner. Heel H, after being placed at position Hi, is sent by rotary table RT1 to position H2' to be toasted. After toasting, heel H is moved by rotary table RT1 from position H2' to position H2 to await transfer to position H3 on rotary table RT3. The transfer of heel H from position H2 to position H3 is preferably accomplished by the same swivel arm and vacuum head that transferred heel H from position H0 to position Hi.

Crown C is moved by rotary table RT2 from position C1 to position C5 where it is toasted. After toasting, rotary table RT2 moves crown C from position C5 to position C6 to await transfer to position C7 on rotary table RT3. The transfer of crown C from position C6 to position C7 is preferably accomplished by the same swivel arm and vacuum head that transferred crown C from position C0 to position C1.

In the assembling system according to this embodiment, rotary table RT3 moves pallets PL from position to position instead of assembly line conveyor ALC as in the previous embodiment. An outer guide 61 and an inner guide 60 are fixed on rotary table RT3 to contain pallets PL. Dividers 66 may be located between inner guide 60 and outer guide 61 to partition rotary table RT3 into separate areas for pallets PL. As rotary table RT3 rotates, sauces and condiments are added by a sauce dispensing apparatus (not shown) at positions S1 and S2. As in the previous embodiment, position P3 is used to add a grilled patty when required. After a pallet PL rotates past position P3, a pusher 63 moves pallet PL to a dress zone 62 for manual additions by operator OP. When operator OP is finished with manual additions, pusher 64 moves pallet PL back onto rotary table RT3. Rotary table RT3 rotates pallet PL to position DA for adding an extra patty if necessary. Crown C is added at position C7, and a pusher 65 moves pallet PL to position LE for entry into the wrapping system.

Figure 9:
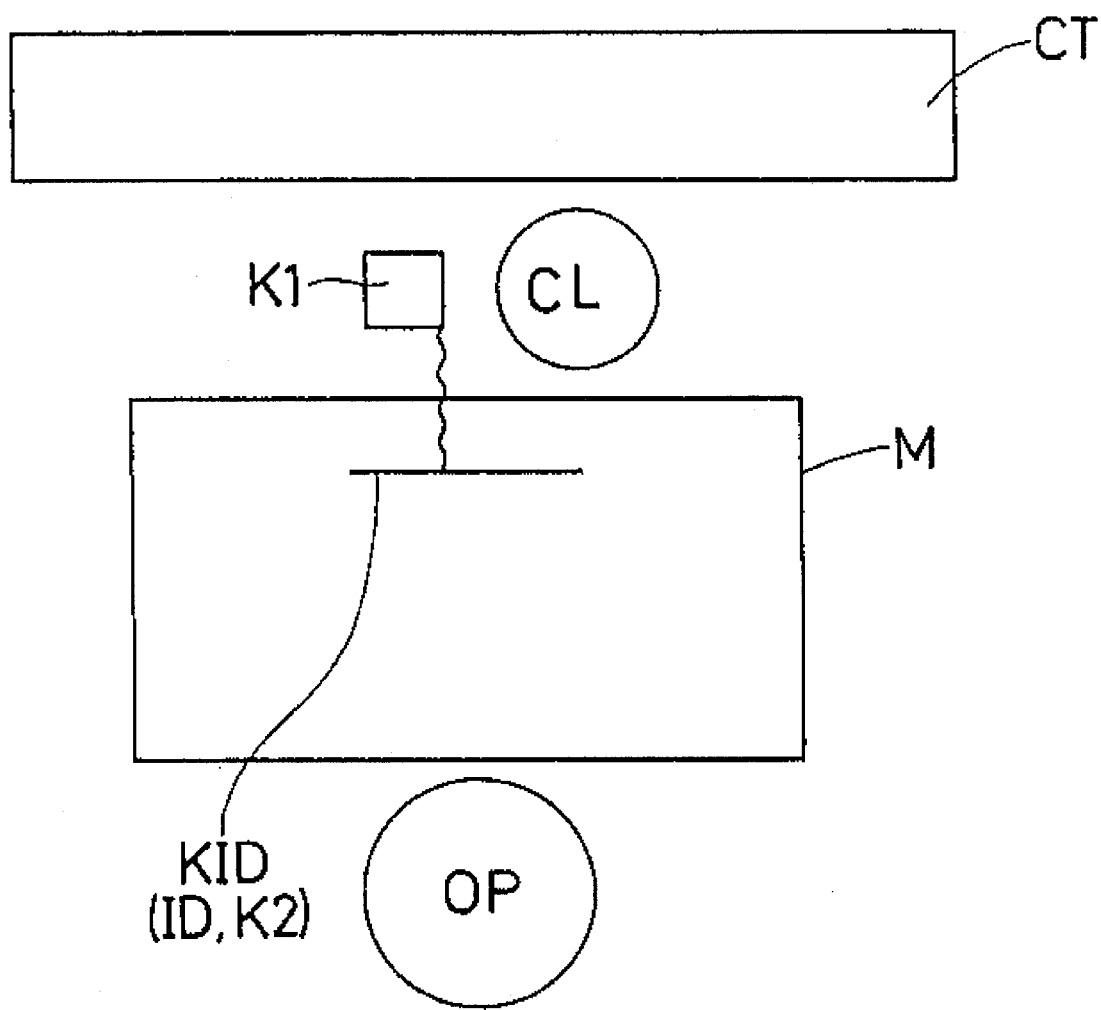
FIG. 9 is a schematic diagram of the use of an alternate feature of the present invention.

Referring to FIG. 9, an alternate feature of the invention is shown. In the previous embodiment, the operator not only manually inputs information into the second input key device K1, but also inputs the order into the first input key device K1 according to information received from a counter person CL. In contrast, in this embodiment, input key device K1 is detachable from input/display board KIB and capable of remote operation. A counter person CL at a counter CT takes orders from customers and inputs the order directly into input key device K1. Operator OP is operating sandwich preparation apparatus M, and uses input/display board KIB as well as input key device K2. In a further embodiment, communications between input key device K1 and input/display board KIB may be by radio, or other means, in order to eliminate the connecting cable. All other aspects of the sandwich preparation apparatus work as in the previous embodiment.

Figure 10:
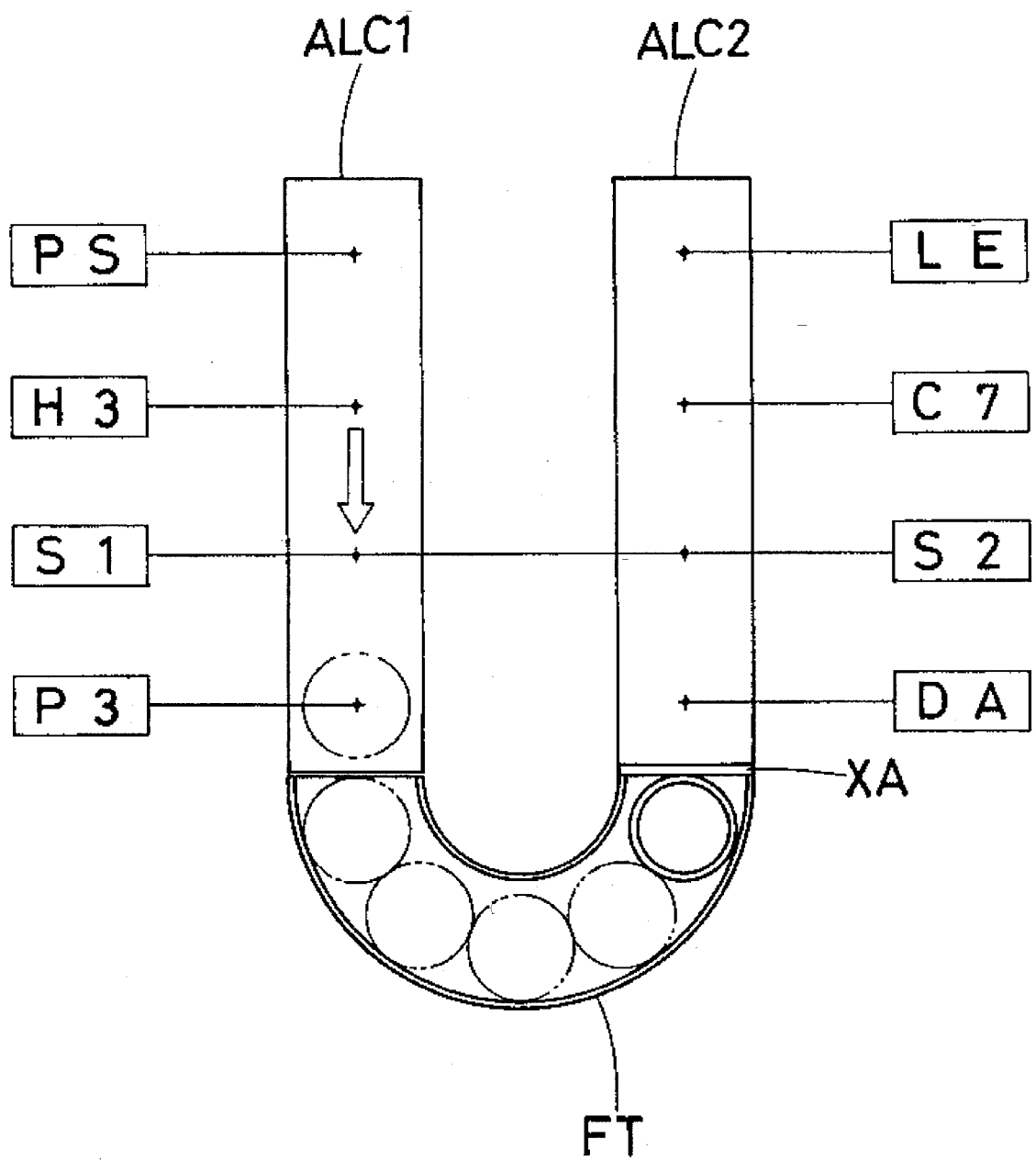
FIG. 10 is a fragmentary top view of an alternative embodiment of the present invention.

Referring to FIG. 10, an alternative embodiment is shown that uses two separate conveyor lines instead of one continuous conveyor. A first assembly line conveyor ALC1 performs the functions previously described for the first automatic fixing section upstream of zone D. Empty pallets are stacked at position PS. Heels H are placed on first assembly line conveyor ALC1 at position H3. Condiments and sauces are added at position S1. A grilled patty P is added at position P3. Instead of pallet PL moving into zone D and being stopped by stopper 53, first assembly line conveyor ALC1 delivers pallet PL to a stationary table FT for manual additions to the sandwich. After manual additions are completed, operator OP places pallet PL on a second assembly line conveyor ALC2 at dummy position DA. Sauces and condiments are added at position S2, and crown C is added at position C7. The completed sandwich is delivered by second assembly conveyor line ALC2 to position LE for entry into the wrapping system. A partition wall XA prevents pallets PL from being pushed onto second assembly line conveyor ALC2 by the motion of first assembly line conveyor ALC1. In this embodiment, there is no stopper 53 to be released by input key device K2.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A sandwich preparation apparatus, comprising:

a food material conveyor having an upstream end region and a downstream end region;

a first automatic preparing section located at said upstream end region;

a second automatic preparing section located at said downstream end region;

a manual preparing section located flow-wise between said upstream starting end region and said downstream end region;

first and second input systems;

said first input system including means for controlling said first automatic preparing section;

said second input system including means for controlling said second automatic preparing section;

means for displaying a plurality of ordered items on a display in response to said first input system; and said means for displaying including means responsive to said second input system for changing said display of a selected one of said plurality of ordered items.

2. An apparatus according to claim 1, wherein said means for displaying comprises an order display device.

3. An apparatus according to claim 2, wherein said first input system comprises:

a first item pad for inputting a designated food item into said order display device;

a first quantity pad for inputting a quantity of said designated food item into said order display device;

first means for showing said quantity inputted;

first means for canceling said input; and first means for confirming said input whereupon said designated food item and said quantity are displayed on said order display device.

4. An apparatus according to claim 3, wherein said second input system comprises:

a second item pad for inputting a designated food item into said order display device;

a second quantity pad for inputting a quantity of said designated food item into said order display device;

second means for showing said quantity inputted;

second means for canceling said input; and second means for confirming said input whereupon said designated food item and said quantity are removed from said order display device.

5. An apparatus according to claim 1, wherein said first input system includes means for permitting remote operation.

6. An apparatus according to claim 1, wherein said first input system is non-detachably mounted on said apparatus.

7. An apparatus for preparing a sandwich, comprising:

means for conveying food material from an upstream end region to a downstream end region;

first means for automatically preparing substantially all of a bottom half of said sandwich;

second means for automatically preparing substantially all of a top half of said sandwich;

a manual preparing section located flow-wise between said first automatic preparing means and said second automatic preparing means;

first means for inputting an order for said sandwich;

second means for inputting information about said sandwich;

said first input means including means for controlling said first automatic preparing means;

said second input means including means for controlling said second automatic preparing means;

means for displaying a plurality of ordered items on a display in response to said first input means; and said means for displaying including means responsive to said second input means for changing said display of a selected one of said plurality of ordered items.

8. An apparatus according to claim 7, wherein said means for displaying comprises an order display device.

9. An apparatus according to claim 8, wherein said first input means comprises:

a first item pad for inputting a designated food item into said order display device;

a first quantity pad for inputting a quantity of said designated food item into said order display device;

first means for showing said quantity inputted;

first means for canceling said input; and first means for confirming said input whereupon said designated food item and said quantity are displayed on said order display device.

10. An apparatus according to claim 9, wherein said second input means comprises:

a second item pad for inputting a designated food item into said order display device;

a second quantity pad for inputting a quantity of said designated food item into said order display device;

second means for showing said quantity inputted;

second means for canceling said input; and second means for confirming said input whereupon said designated food item and said quantity are removed from said order display device.

11. An apparatus according to claim 7, wherein said first input means includes means for operating from a remote location.

12. An apparatus according to claim 7, wherein said bottom half includes a heel and said top half includes a crown.

13. An apparatus according to claim 7, wherein said bottom half includes a crown and said top half includes a heel.

14. A method for preparing a sandwich, comprising the steps of:

conveying food material from an upstream end region to a downstream end region;

automatically preparing substantially all of a bottom half of said sandwich;

automatically preparing substantially all of a top half of said sandwich;

a manual preparing section being located flow-wise between said first automatic preparing means and said second automatic preparing means;

inputting an order and associated information for said sandwich into an order display device;

controlling, in response to said order and associated information, the step of automatically preparing substantially all of said bottom half of said sandwich;

controlling, in response to an input by an operator, the step of automatically preparing substantially all of said top half of said sandwich;

displaying a plurality of ordered items on said order display device in response to the steps of controlling; and changing a display on said order display device of a selected one of said plurality of ordered items in response to an input.

15. A method according to claim 14, wherein the step of inputting an order and associated information for said sandwich further comprises:

inputting a quantity of a designated food item into said order display device;

showing said quantity inputted;

canceling said input when said input is in error; and confirming said input when said input is correct whereupon said designated food item and said quantity are displayed on said order display device.

* * * * *